United States Patent
Lee

(10) Patent No.: US 10,124,729 B2
(45) Date of Patent: Nov. 13, 2018

(54) METHOD AND APPARATUS FOR PROVIDING DRIVING INFORMATION

(71) Applicant: HYUNDAI MOBIS Co., Ltd., Yongin-si (KR)

(72) Inventor: Hyung Gu Lee, Yongin-si (KR)

(73) Assignee: HYUNDAI MOBIS Co., Ltd., Yongin-si (KR)

( * ) Notice: Subject to any disclaimer, the term of this patent is extended or adjusted under 35 U.S.C. 154(b) by 134 days.

(21) Appl. No.: 14/947,179

(22) Filed: Nov. 20, 2015

(65) Prior Publication Data
US 2016/0144786 A1 May 26, 2016

(30) Foreign Application Priority Data
Nov. 21, 2014 (KR) .................. 10-2014-0163771

(51) Int. Cl.
| | | |
|---|---|---|
| *B60R 1/00* | (2006.01) | |
| *G06K 9/00* | (2006.01) | |
| *H04N 13/02* | (2006.01) | |
| *H04N 13/204* | (2018.01) | |

(52) U.S. Cl.
CPC ............ *B60R 1/00* (2013.01); *G06K 9/00604* (2013.01); *G06K 9/00832* (2013.01); *H04N 13/0203* (2013.01); *H04N 13/204* (2018.05); *B60R 2300/108* (2013.01)

(58) Field of Classification Search
CPC ................... G06K 9/00832; H04N 13/0203
See application file for complete search history.

(56) References Cited

U.S. PATENT DOCUMENTS

| | | | |
|---|---|---|---|
| 2003/0006888 A1* | 1/2003 | Burchette, Jr. .......... | B60R 1/12 340/425.5 |
| 2009/0268025 A1* | 10/2009 | Hiramaki ................. | B60R 1/00 348/148 |
| 2015/0054951 A1* | 2/2015 | Maytal .............. | G06K 9/00845 348/148 |
| 2015/0151753 A1* | 6/2015 | Clarke ................. | B60W 30/00 701/25 |

(Continued)

FOREIGN PATENT DOCUMENTS

| | | |
|---|---|---|
| CN | 101269635 A1 | 9/2008 |
| CN | 101500874 A | 9/2009 |

(Continued)

*Primary Examiner* — William C Vaughn, Jr.
*Assistant Examiner* — Jerry Jean Baptiste
(74) *Attorney, Agent, or Firm* — Baker McKenzie; Hyunho Park

(57) ABSTRACT

The present invention provides a driving information providing apparatus, including: a light field camera which photographs an image in at least one direction of a vehicle to output image information; a driver sight line detecting unit which outputs a position of a view point in which a driver of the vehicle views the outside of the vehicle; a depth information calculating unit which outputs three-dimensional depth information from the image information; and an image outputting unit which outputs a predetermined image to the driver of the vehicle based on the position of the view point of the driver of the vehicle and the three-dimensional depth information, and a driving information providing method.

20 Claims, 2 Drawing Sheets

(56) References Cited

U.S. PATENT DOCUMENTS

2015/0189241 A1* 7/2015 Kim .................. H04N 7/181
                                                        348/148
2016/0121794 A1* 5/2016 Iguchi ............... G08G 1/166
                                                        345/7

FOREIGN PATENT DOCUMENTS

CN          101883291 A     11/2010
CN          103207664 A      7/2013

* cited by examiner

METHOD AND APPARATUS FOR PROVIDING DRIVING INFORMATION

CROSS-REFERENCE TO RELATED APPLICATIONS

The present application claims priority to Korean Patent Application Number 10-2014-0163771 filed Nov. 21, 2014, the entire contents of which application is incorporated herein for all purposes by this reference.

TECHNICAL FIELD

The present invention relates to a driving information providing apparatus and a method thereof, and more particularly, to a driving information providing apparatus which provides an outside image of a vehicle in accordance with a sight line position of a driver, traffic information, and navigation information to the driver of the vehicle and a method thereof.

BACKGROUND

Recently, a technique which obtains and analyzes an outside image of a vehicle to provide the result to a driver of the vehicle is employed in many vehicles. However, since a normal camera outputs only an outside image corresponding to one focus, information which is provided to the driver of the vehicle is limited.

In contrast, when several cameras are provided in the vehicle, the cameras may obstruct the driver's field of vision and lots of costs are required to provide cameras at every position of the sight line of the driver. Further, there may be difficulty in fixing the cameras.

A light field camera is a multi focus camera. The light field camera includes depth information of all objects in a captured image.

Recently, a technique which detects a sight line position of the driver and provides an image of the vehicle in accordance with the sight line position and driving information to the driver of the vehicle is being studied.

SUMMARY

The present invention has been made in an effort to provide a driving information providing apparatus which outputs a sight line position of a driver using a camera provided in a vehicle, outputs an image using a light field camera, and provides an image of one side of the vehicle in accordance with the sight line position of the driver, and traffic information or navigation information to the driver of the vehicle and a driving information providing method.

Objects of the present invention are not limited to the above-mentioned objects, and other objects, which are not mentioned above, can be clearly understood by those skilled in the art from the following descriptions.

An exemplary embodiment of the present invention provides a driving information providing apparatus, including: a light field camera which photographs an image in at least one direction of a vehicle to output image information; a driver sight line detecting unit which outputs a position of a view point of a driver of the vehicle; a depth information calculating unit which outputs three-dimensional depth information from the image information; and an image outputting unit which outputs a predetermined image to the driver of the vehicle based on the position of the view point of the driver of the vehicle and the three-dimensional depth information.

The driver sight line detecting unit may output aposition of the view point in which the driver views the outside in consideration of up, down, left, and right moving directions of a pupil of the driver.

The driver sight line detecting unit may output a position of the view point in which the driver views the outside in consideration of a most frequent moving direction among up, down, left, and right moving directions of a pupil of the driver.

The driver sight line detecting unit may count how many times the eyes of the driver move in up, down, left, and right directions to calculate the frequency.

The depth information calculating unit may output three-dimensional depth information from the image of the vehicle in one direction in accordance with the view point position in which the driver views the outside of the vehicle.

The apparatus may further include a driving information providing unit which outputs at least one of traffic information and navigation information in consideration of a position of the view point of the driver of the vehicle.

The traffic information may include road information, lane information, and traffic sign information and the navigation information includes weather, a landmark, and a geographical feature.

The driving information providing unit may measure reflectance of a road surface to notify the driver of the vehicle of the road status change.

Another exemplary embodiment of the present invention provides a driving information providing method, including: outputting a position of a view point of a driver of the vehicle; photographing an image of the vehicle in at least one direction to output image information; outputting three-dimensional depth information from the image information of the vehicle; and outputting a predetermined image to the driver of the vehicle based on the position of the view point of the driver of the vehicle and the three-dimensional depth information.

In the outputting of a position of a view point, a region of interest may be set in an image obtained by photographing eyes of the driver to detect a feature of a face of the driver.

In the outputting of a position of a view point, the position of the view point may be output in consideration of up, down, left, and right moving directions of a pupil of the driver.

In the outputting of a position of a view point, a position of a view point in which the driver views the outside may be output in consideration of a most frequent moving direction among up, down, left, and right moving directions of a pupil of the driver.

In the outputting of a position of a view point, how many times the eyes of the driver move in up, down, left, and right directions may be counted to calculate the frequency.

In the outputting of three-dimensional depth information, three-dimensional depth information may be output from the image of the vehicle in one direction in accordance with the view point position in which the driver views the outside of the vehicle.

The method may further include outputting at least one of traffic information and navigation information in consideration of a position of the view point of the driver of the vehicle.

The traffic information may include road information, lane information, and traffic sign information and the navigation information includes weather, a landmark, and a geographical feature.

In the outputting of traffic information and navigation information, when the position of the view point of the driver of the vehicle is the road, a road status change may be notified to the driver of the vehicle in consideration of weather.

In the outputting of traffic information and navigation information, reflectance of a road surface may be measured to notify the driver of the vehicle of the road status change.

Specific items of other embodiments are included in the detailed description and the drawings.

The driving information providing apparatus and the driving information providing method of the present invention have one or more effects as follows.

First, by applying a statistical method which outputs a position of a view point in which the driver views the outside in consideration of a direction where a pupil of the driver most frequent moves, among directions of moving up, down, left and right the pupil of the driver, a sight line position of the driver which changes in real time is quickly calculated.

Second, by outputting an image of the vehicle in one direction to the driver of the vehicle in consideration of the view point position of the driver of the vehicle and three-dimensional depth information, a one image of the vehicle which is not directly viewed by the driver of the vehicle is clearly viewed by the driver of the vehicle.

Third, by outputting the traffic information and the navigation information in consideration of the view point position of the driver of the vehicle and three-dimensional depth information, various traffic information and navigation information which are not provided from an image which is fixed to a predetermined focus in the related art may be provided to the driver.

Fourth, a light field camera is used to continuously generate images in accordance with change of the view point of the driver and simply and precisely provide the image to the driver.

The effects of the present invention are not limited to the aforementioned effects, and other effects, which are not mentioned above, will be apparently understood by a person skilled in the art from the recitations of the claims.

DETAILED DESCRIPTION

Figure 1:
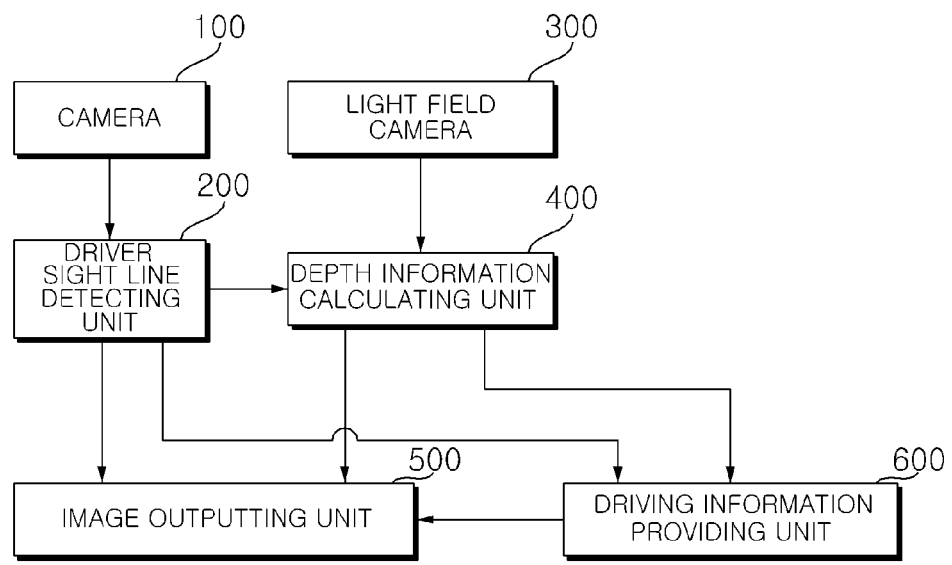
FIG. 1 is a diagram illustrating a configuration of a driving information providing apparatus according to an exemplary embodiment of the present invention.

The advantages and characteristics of the present invention and methods for achieving the same will become clear from the embodiments set forth in detail below with reference to the attached drawings. However, the present invention is not limited to the embodiments set forth below, and may be embodied in various other forms. The present embodiments are for rendering the description of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Herein, the present invention will be described with reference to the drawings for explaining a driving information providing apparatus according to an embodiment of the present invention.

FIG. 1 is a diagram illustrating a configuration of a driving information providing apparatus according to an exemplary embodiment of the present invention. Referring to FIG. 1, a driving information providing apparatus according to an exemplary embodiment of the present invention includes a camera 100, a driver sight line detecting unit 200, a light field camera 300, a depth information calculating unit 400, an image outputting unit 500, and a driving information providing unit 600.

The camera 100 is provided in the vehicle. The camera 100 photographs an eye of the driver of the vehicle. The camera 100 outputs the image obtained by photographing the eye of the driver to the driver sight line detecting unit 200.

The driver sight line detecting unit 200 outputs a position of a view point in which the driver views the outside in consideration of up, down, left, and right moving directions of a pupil of the driver. The driver sight line detecting unit 200 outputs a sight line in which the driver views the outside in consideration of a most frequent moving direction among up, down, left, and right moving directions of a pupil of the driver.

The driver sight line detecting unit 200 may detect a head, a nose, a lip, and eyes of the driver through a bitmap operation. The driver sight line detecting unit 200 detects that the eyes of the driver move up, down, left, and right, from the image obtained by photographing the eyes of the driver. The driver sight line detecting unit 200 detects a feature of the eyes of the driver by setting a region of interest in a coordinate of the image obtained by photographing the eyes of the driver.

The driver sight line detecting unit 200 chases movement of the pupil from the detected eye of the driver. The driver sight line detecting unit 200 sets an image coordinate of the pupil to detect a direction where the pupil moves. The driver sight line detecting unit 200 counts how many times the eyes of the driver move up, down, left, and right, from the image obtained by photographing the eyes of the driver to calculate a frequency.

The light field camera 300 photographs an image of the vehicle in one direction to output image information to the depth information calculating unit 400. The light field camera 300 is a multi focus camera and outputs an image including depth information of all pixels in a photographing viewing angle of the camera. The image information of the light field camera 300 includes an RGB value of the image in accordance with all focuses of the image.

The depth information calculating unit 400 outputs three-dimensional depth information from the image information of the vehicle. The depth information calculating unit 400 outputs the three-dimensional depth information from the image of the vehicle in accordance with the view point position in which the driver views the outside of the vehicle.

When an aspect of the vehicle is a Bayer type, the depth information calculating unit 400 converts the Bayer type into an RGB type. When the image of the vehicle is an RGB type, the depth information calculating unit 400 may use the image of the vehicle as it is without converting the image.

The depth information calculating unit 400 may output images with varied focuses for every pixel of the image of the vehicle. The depth information calculating unit 400 extracts and outputs three-dimensional depth information of an object from the image of the vehicle in accordance with the varied focuses.

The image outputting unit 500 outputs an image to the driver of the vehicle in consideration of the view point position of the driver of the vehicle and the three-dimensional depth information. The image outputting unit 500 receives a position of the view point of the driver of the vehicle which is output from the driver sight line detecting unit 200. The image outputting unit 500 may receive a position of a sight line of the eye of the driver which is continuously output from the driver sight line detecting unit 200 in real time. The image output unit 500 outputs a predetermined image based on the image coordinate in accordance with the position of the sight line of the eye of the driver of the vehicle and the three-dimensional depth information of the vehicle image.

The image outputting unit 500 outputs a vehicle image corresponding to the position of the sight line of the eye of the driver of the vehicle. The image outputting unit 500 outputs a clear vehicle image which is captured by the light field camera 300 in a region having a dead zone due to a limitation of a vision of the driver of the vehicle and an obstacle, in accordance with the position of the sight line of the driver of the vehicle.

The image outputting unit 500 may output a continuous image or a discrete image with a predetermined time interval. This is because the position of the view point of the driver of the vehicle rapidly changes so that when the sight line of the driver is output in real time, it is inconvenient for the driver of the vehicle. The image outputting unit 500 may include a device, such as a button or a virtual interface, which allows the driver of the vehicle to select the continuous image or the discrete image.

The driving information providing unit 600 may provide at least one of traffic information and navigation information in consideration of the position of the view point of the driver of the vehicle and the three-dimensional depth information to the driver of the vehicle. The driving information providing unit 600 may provide the information to the driver by considering not the three-dimensional depth information, but the position of the view point of the driver of the vehicle. The driving information providing unit 600 outputs to show the traffic information with respect to an object which is located in the position of the view point of the driver of the vehicle to the driver of the vehicle by way of a sound or through a screen. The traffic information may include road information, lane information, and traffic sign information. When there is a landmark or a geographical feature in the position of the view point of the driver of the vehicle, the driving information providing unit 600 interworks with a navigation system to notify the driver of a position of the landmark or the geographical feature or an estimated driving time by way of a sound or through the screen. The navigation information may include weather information. The driving information providing unit 600 according to an exemplary embodiment receives weather information from the navigation information and when the position of the view point of the driver of the vehicle is a road surface, notifies the driver of the vehicle of a status change of the road due to a weather condition such as rain or snow. The driving information providing unit 600 may measure a reflectance of the road surface to detect the status change of the road and notify the driver of the vehicle of the status change of the road.

An operation of a driving information providing method according to an exemplary embodiment of the present invention configured as described above will be described below.

Figure 2:
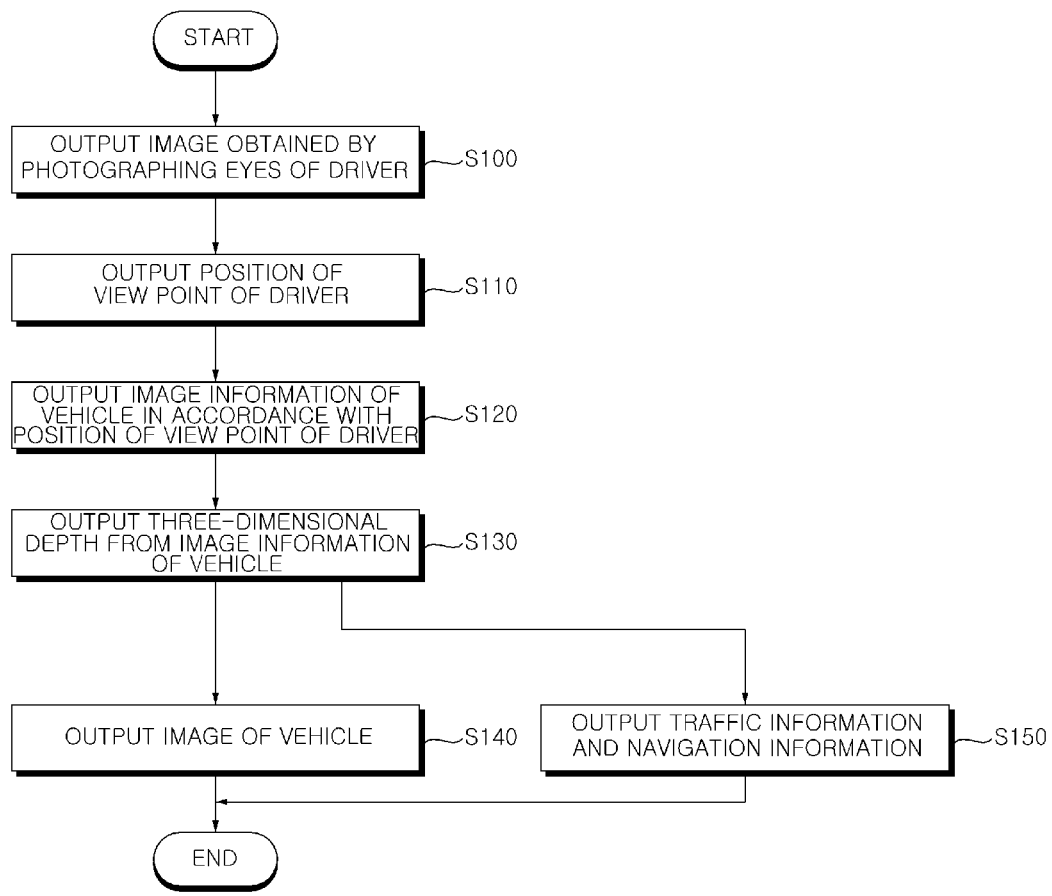
FIG. 2 is a control flowchart illustrating a control flow of a driving information providing method by the configuration illustrated in FIG. 1.

FIG. 2 is a control flowchart illustrating a control flow of a driving information providing method by the configuration illustrated in FIG. 1.

Referring to FIG. 2, a camera 100 photographs an eye of the driver of the vehicle. The camera 100 outputs the image obtained by photographing the eye of the driver to the driver sight line detecting unit 200 in step S100.

The driver sight line detecting unit 200 outputs a position of a view point in which the driver of the vehicle views the outside of the vehicle in step S110. The driver sight line detecting unit 200 outputs a sight line in which the driver views the outside in consideration of up, down, left, and right moving directions of a pupil of the driver. The driver sight line detecting unit outputs a sight line in which the driver views the outside in consideration of a most frequent moving direction among up, down, left, and right moving directions of a pupil of the driver.

The driver sight line detecting unit 200 detects that the eyes of the driver move up, down, left, and right, from the image obtained by photographing the eyes of the driver. The driver sight line detecting unit 200 detects a feature of a face of the driver by setting a region of interest in a coordinate of the image obtained by photographing the eyes of the driver. The driver sight line detecting unit 200 detects a head, a nose, and a lip of the driver to detect eyes of the driver. The driver sight line detecting unit 200 chases movement of the pupil from the detected eye of the driver. The driver sight line detecting unit 200 sets an image coordinate of the pupil to detect a direction where the pupil moves. The driver sight line detecting unit 200 counts how many times the eyes of the driver move up, down, left, and right, from the image obtained by photographing the eyes of the driver.

The light field camera 300 photographs one direction of the vehicle to output image information to the depth information calculating unit 400 in step S120.

The depth information calculating unit 400 outputs three-dimensional depth information from the image information of the vehicle in step S130. The depth information calculating unit 400 outputs the three-dimensional depth information from the image of the vehicle in accordance with the view point position in which the driver views the outside of the vehicle in step S130. The depth information calculating unit 400 converts a Bayer type vehicle image into an RGB type image. The depth information calculating unit 400 may output images at all focuses in all pixels of the image of the vehicle. The depth information calculating unit 400 extracts and outputs three-dimensional depth information of an object from the image of the vehicle in accordance with all focuses.

The image outputting unit 500 outputs an image of the vehicle to the driver of the vehicle in consideration of the view point position of the driver of the vehicle and the three-dimensional depth information in step S140. The image outputting unit 500 receives a position of the view point of the driver of the vehicle which is output from the driver sight line detecting unit 200. The image outputting unit 500 may receive a position of a sight line of the eye of the driver which is continuously output from the driver sight line detecting unit 200 in real time. The image output unit 500 outputs an image of the vehicle corresponding to the position of the sight line of the eyes of the driver of the vehicle based on the image coordinate in accordance with the position of the sight line of the eye of the driver of the vehicle and the three-dimensional depth information of one vehicle image. The image outputting unit 500 outputs a clear vehicle image which is captured by the light field camera 300 in a region having a dead zone due to a limitation of a vision of the driver of the vehicle and an obstacle, in accordance with the position of the sight line of the driver of the vehicle.

The driving information providing unit 600 may provide at least one of the traffic information and the navigation information in consideration of the position of the view point of the driver of the vehicle and the three-dimensional depth information in step S150. In the meantime, the driving information providing unit 600 may not receive the three-dimensional depth information, but receive information on the position of the view point of the driver of the vehicle and provide any one of the information. When there is traffic information, that is, lane information or traffic sign information in a position of a view point of the driver of the vehicle, the driving information providing unit 600 outputs to show the information to the driver of the vehicle by way of a sound or through a screen. When there is a landmark or a geographical feature in the position of the view point of the driver of the vehicle, the driving information providing unit 600 interworks with a navigation system to notify the driver of a position of the landmark or the geographical feature or an estimated driving time by way of the sound or through the screen. When the position of the view point of the driver of the vehicle is a road surface, the driving information providing unit 600 according to an exemplary embodiment notifies the driver of the vehicle of a status change of the road due to a weather condition such as rain or snow. In order to detect the status change of the road by the driving information providing unit 600, a method of measuring reflectance of a road surface may be used. The driving information providing unit 600 may simultaneously perform step S140 and step S150.

Preferred embodiments of the present invention have been illustrated and described above, but the present invention is not limited to the above-described specific embodiments, it is obvious that various modifications may be made by those skilled in the art, to which the present invention pertains without departing from the gist of the present invention, which is claimed in the claims, and such modification should not be individually understood from the technical spirit or prospect of the present invention.

What is claimed is:

1. A driving information providing apparatus, comprising:
a light field camera, the light field camera photographing an image in at least one direction of a vehicle to output image information;
driver sight line detecting circuitry, the driver sight line detecting circuitry outputting a position of a view point of a driver of the vehicle;
depth information calculating circuitry, the depth information calculating circuitry outputting three-dimensional depth information from single directional image information in accordance with the position of the view point of the driver of the vehicle; and
image outputting circuitry, the image outputting circuitry outputting an image to the driver of the vehicle based on the position of the view point of the driver of the vehicle and the three-dimensional depth information obtained from the single directional image information in accordance with the position of the view point of the driver of the vehicle,
wherein the driver sight line detecting circuitry sets an image coordinate of a pupil of the driver of the vehicle to detect a direction where the pupil of the driver moves and the position of the view point of the driver of the vehicle changes based on a direction where the pupil of the driver most frequently moves, and
wherein the image outputting circuitry outputs an updated image to the driver of the vehicle based on the changed position of the view point and a changed three-dimensional depth information,
wherein the image outputting circuitry outputs a continuous image in real time and in a predetermined time interval when a position of a sight line of the eye of the driver changes, such that the image of the vehicle corresponding to the position of the sight line of the eyes of the driver of the vehicle is continuously output based on the image coordinate in accordance with the changed position of the sight line of the eye of the driver of the vehicle and the three-dimensional depth information.

2. The driving information providing apparatus of claim 1, wherein the driver sight line detecting circuitry sets a region of interest in an image obtained by photographing eyes of the driver to detect a feature of the eyes of the driver.

3. The driving information providing apparatus of claim 1, wherein the driver sight line detecting circuitry outputs a position of a view point in which the driver views the outside in consideration of up, down, left, and right moving directions of a pupil of the driver.

4. The driving information providing apparatus of claim 1, wherein the driver sight line detecting circuitry outputs a position of a view point in which the driver views the outside in consideration of a most frequent moving direction among the up, down, left, and right moving directions of the pupil of the driver.

5. The driving information providing apparatus of claim 4, wherein the driver sight line detecting circuitry counts how many times the eyes of the driver move in up, down, left, and right directions to calculate the frequency.

6. The driving information providing apparatus of claim 1, wherein the depth information calculating circuitry outputs three-dimensional depth information from the one directional image information in accordance with the position of the view point in which the driver views the outside of the vehicle.

7. The driving information providing apparatus of claim 1, further comprising:
a driving information providing circuitry, outputting at least one of traffic information and navigation information in consideration of a position of the view point of the driver of the vehicle.

8. The driving information providing apparatus of claim 7, wherein the traffic information includes road information, lane information, and traffic sign information and the navigation information includes weather, a landmark, and a geographical feature.

9. The driving information providing apparatus of claim 8, wherein the driving information providing circuitry notifies the driver of the vehicle of a road status change when the position of the view point of the driver of the vehicle is the road in consideration of the weather.

10. The driving information providing apparatus of claim 9, wherein the driving information providing circuitry measures reflectance of a road surface to notify the driver of the vehicle of the road status change.

11. A driving information providing method, comprising:
photographing an image of the vehicle in at least one direction to output image information;

outputting a position of a view point of a driver of the vehicle;

outputting three-dimensional depth information from single directional image information in accordance with the position of the view point of the driver of the vehicle; and outputting an image to the driver of the vehicle based on the position of the view point of the driver of the vehicle and the three-dimensional depth information obtained from the single directional image information in accordance with the position of the view point of the driver of the vehicle, wherein an image coordinate of a pupil of the driver is set to detect a direction where the pupil of the driver of the vehicle moves and the position of the view point of the driver of the vehicle changes based on a direction where a pupil of the driver of the vehicle most frequently moves, and wherein an updated image is outputted to the driver of the vehicle based on the changed position of the view point and a changed three-dimensional depth information, wherein outputting the image to the driver comprises outputting a continuous image in a real time and in a predetermined time interval when a position of a sight line of the eye of the driver changes, such that the image of the vehicle corresponding to the position of the sight line of the eyes of the driver of the vehicle is continuously output based on the image coordinate in accordance with the changed position of the sight line of the eye of the driver of the vehicle and the three-dimensional depth information.

12. The driving information providing method of claim 11, wherein in the outputting of a position of a view point, a region of interest is set in an image obtained by photographing eyes of the driver to detect a feature of a face of the driver.

13. The driving information providing method of claim 11, wherein in the outputting of a position of a view point, the position of the view point is output in consideration of up, down, left, and right moving directions of a pupil of the driver.

14. The driving information providing method of claim 11, wherein in the outputting of a position of a view point, a position of a view point in which the driver views the outside is output in consideration of a most frequent moving direction among the up, down, left, and right moving directions of the pupil of the driver.

15. The driving information providing method of claim 14, wherein in the outputting of a position of a view point, how many times the eyes of the driver move in up, down, left, and right directions is counted to calculate the frequency.

16. The driving information providing method of claim 11, wherein in the outputting of three-dimensional depth information, three-dimensional depth information is output from the one directional image information in accordance with the position of the view point in which the driver views the outside of the vehicle.

17. The driving information providing method of claim 11, further comprising: outputting at least one of traffic information and navigation information in consideration of a position of the view point of the driver of the vehicle.

18. The driving information providing method of claim 17, wherein the traffic information includes road information, lane information, and traffic sign information and the navigation information includes weather, a landmark, and a geographical feature.

19. The driving information providing method of claim 18, wherein in the outputting of traffic information and navigation information, when the position of the view point of the driver of the vehicle is on the road, a road status change is notified to the driver of the vehicle in consideration of the weather.

20. The driving information providing method of claim 19, wherein in the outputting of traffic information and navigation information, reflectance of a road surface is measured to notify the driver of the vehicle of the road status change.

* * * * *